US012737149B2

(12) United States Patent
Ishii et al.

(10) Patent No.: US 12,737,149 B2
(45) Date of Patent: Sep. 15, 2026

(54) NOTIFICATION SYSTEM, NOTIFICATION METHOD, CONTROL DEVICE, AND RECORDING MEDIUM

(71) Applicant: Panasonic Intellectual Property Management Co., Ltd., Osaka (JP)

(72) Inventors: Masahiro Ishii, Hyogo (JP); Hiromu Ikeuchi, Hyogo (JP); Sara Asai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 195 days.

(21) Appl. No.: 18/701,882

(22) PCT Filed: Sep. 25, 2023

(86) PCT No.: PCT/JP2023/034741
§ 371 (c)(1),
(2) Date: Apr. 16, 2024

(87) PCT Pub. No.: WO2025/069139
PCT Pub. Date: Apr. 3, 2025

(65) Prior Publication Data
US 2025/0244944 A1 Jul. 31, 2025

(51) Int. Cl.
*G06F 3/16* (2006.01)

(52) U.S. Cl.
CPC .................................... *G06F 3/16* (2013.01)

(58) Field of Classification Search
None
See application file for complete search history.

(56) References Cited

U.S. PATENT DOCUMENTS

| | | | | |
|---|---|---|---|---|
| 11,076,035 | B2 * | 7/2021 | Lambourne | H04M 1/72412 |
| 2014/0136629 | A1 * | 5/2014 | Nguyen | H04L 51/224 709/206 |
| 2014/0344375 | A1 * | 11/2014 | Hauser | G06F 3/167 709/206 |
| 2020/0073731 | A1 * | 3/2020 | Fish | G06F 9/546 |
| 2022/0342628 | A1 * | 10/2022 | Carrigan | H04M 1/6066 |

FOREIGN PATENT DOCUMENTS

JP 2017-151718 A 8/2017

OTHER PUBLICATIONS

International Search Report dated Nov. 21, 2023 issued in International Patent Application No. PCT/JP2023/034741.

* cited by examiner

*Primary Examiner* — Hemant S Patel
(74) *Attorney, Agent, or Firm* — RIMON P.C.

(57) ABSTRACT

A notification system includes: an obtainer that obtains an audio content to be notified of and priority information on priority of the audio content; a first notifier that notifies of the audio content; and a controller that performs first control of controlling notification of the audio content by the first notifier in accordance with the priority identified based on the priority information obtained by the obtainer. In the first control, the controller: causes the first notifier to notify of the audio content, when the priority is a first rank; and prevents the first notifier from notifying of the audio content, when the priority is a second rank that is lower than the first rank.

16 Claims, 5 Drawing Sheets

Figure 2:
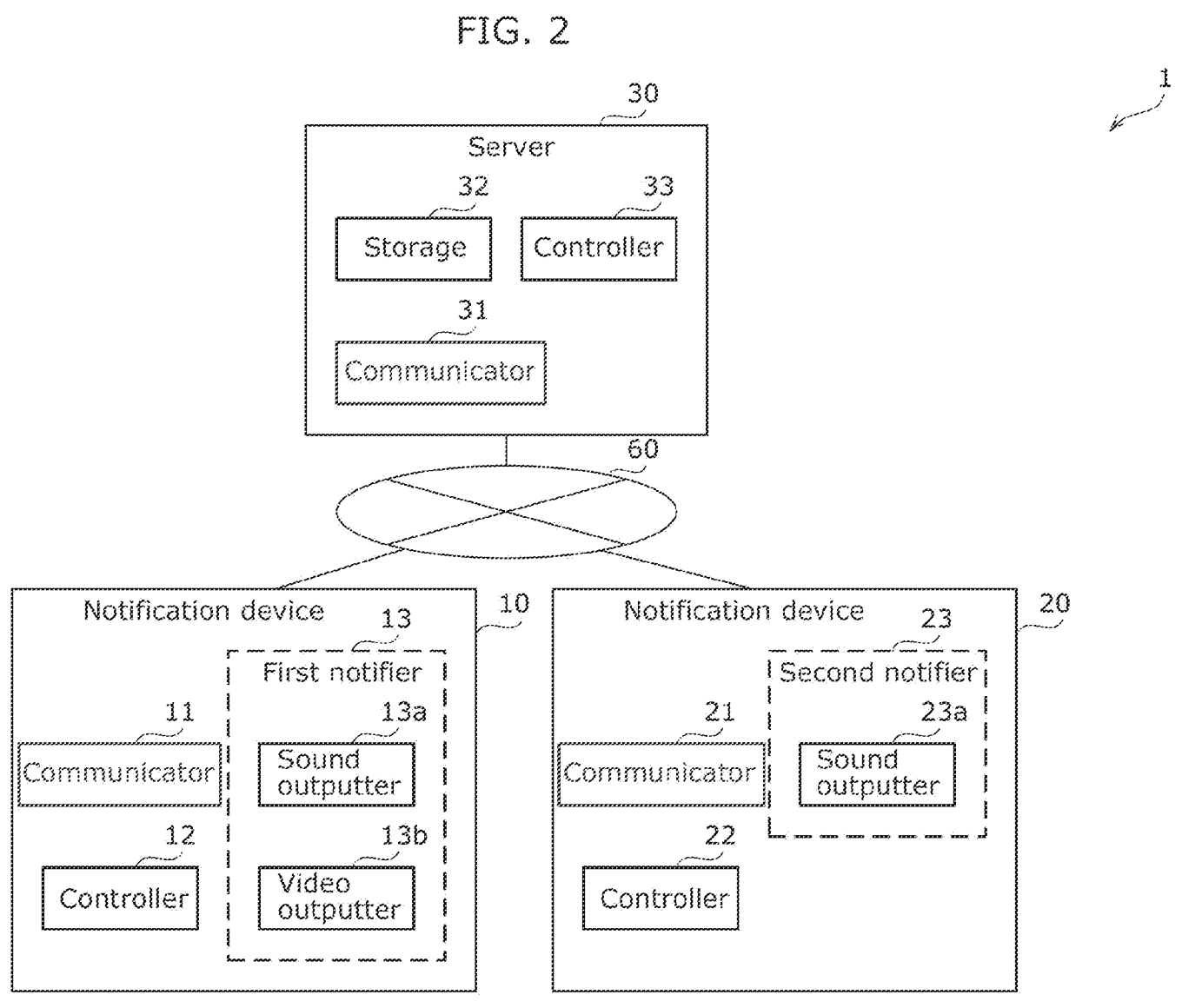

Server 30
Storage 32
Controller 33
Communicator 31
60
Notification device 10
Communicator 11
Controller 12
First notifier 13
Sound outputter 13a
Video outputter 13b
Notification device 20
Communicator 21
Controller 22
Second notifier 23
Sound outputter 23a

NOTIFICATION SYSTEM, NOTIFICATION METHOD, CONTROL DEVICE, AND RECORDING MEDIUM

CROSS-REFERENCE OF RELATED APPLICATIONS

This application is the U.S. National Phase under 35 U.S.C. § 371 of International Patent Application No. PCT/JP2023/034741, filed on Sep. 25, 2023, the entire disclosure of which Application is incorporated by reference herein.

TECHNICAL FIELD

The present disclosure relates to a notification system, a notification method, a control device, and a recording medium.

BACKGROUND ART

Patent Literature (PTL) 1 discloses causing a home appliance, which has a sound input and output function, to emit a sound by instructing the home appliance on the content and timing of emission.

CITATION LIST

Patent Literature

[PTL 1] Japanese Unexamined Patent Application Publication No. 2017-151718

SUMMARY OF INVENTION

Technical Problem

The present disclosure provides a notification system, and so on, capable of effectively notifying the user of an audio content.

Solution to Problem

A notification system according to an aspect of the present disclosure includes: an obtainer that obtains an audio content to be notified of and priority information on priority of the audio content; a first notifier that notifies of the audio content; and a controller that performs first control of controlling notification of the audio content by the first notifier in accordance with the priority identified based on the priority information obtained by the obtainer. In the first control, the controller: causes the first notifier to notify of the audio content, when the priority is a first rank; and prevents the first notifier from notifying of the audio content, when the priority is a second rank that is lower than the first rank.

A notification method according to an aspect of the present disclosure includes: obtaining an audio content to be notified of and priority information on priority of the audio content; determining whether to notify of the audio content in accordance with the priority identified based on the priority information; and notifying of the audio content based on a result of the determining. The determining includes: determining to notify of the audio content, when the priority is a first rank; and determining not to notify of the audio content, when the priority is a second rank that is lower than the first rank.

A control device according to an aspect of the present disclosure is communicably connected to a notification device. The control device includes: an obtainer that obtains an audio content to be notified of and priority information on priority of the audio content; and a controller that controls notification of the audio content by the notification device in accordance with the priority identified based on the priority information obtained by the obtainer. The controller: causes the notification device to notify of the audio content, when the priority is a first rank; and prevents the notification device from notifying of the audio content, when the priority is a second rank that is lower than the first rank.

Note that these general and specific aspects of the present disclosure may be implemented using a device, an integrated circuit, a computer program, or a non-transitory computer-readable recording medium such as a CD-ROM, or any combination of devices, methods, systems, integrated circuits, computer programs, or non-transitory computer-readable recording media.

Advantageous Effects of Invention

The notification system, and so on, according to the present disclosure can effectively notify the user of an audio content.

BRIEF DESCRIPTION OF DRAWINGS

FIG. 2 shows an example configuration of the notification system according to the embodiment.

DESCRIPTION OF EMBODIMENT

Figure 1:
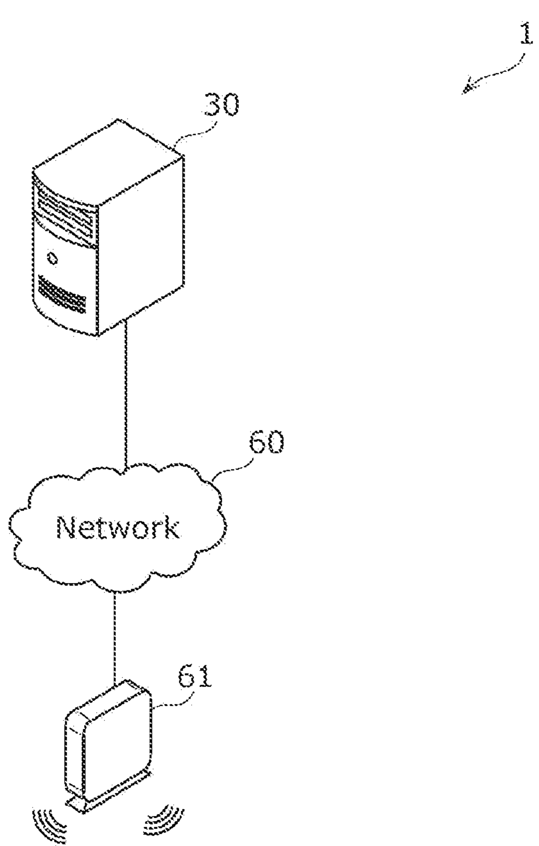
FIG. 1 is for illustrating an outline of a notification system according to an embodiment.
Figure 1:
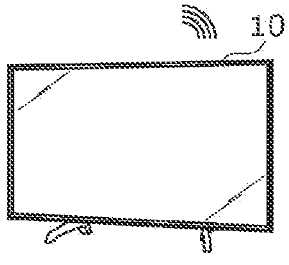
Figure 1:
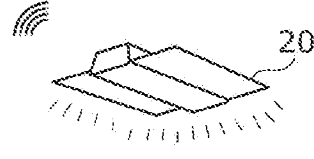

Underlying Knowledge Forming Basis of the Present Disclosure

In the background art technique, a notification device emits a sound according to a sound emission instruction upon receipt of a sound emission instruction from a server. In this manner, the notification device emits the sound to make a notification to the user. However, if the sound is emitted while the user is engaged in another activity, such as viewing a content, the user may feel the notification by the sound disturbing the activity and annoying. On the other hand, the notification includes an immediate notification by a sound which may be beneficial to the user. For example, such a notification may be for notifying of the stop of a home appliance of the user due to an error in an operation. In this manner, a notification by a sound may contain what is to be notified of immediately and what is not to be notified of immediately.

After intensive studies, the inventors have conceived of a notification system that effectively makes a notification to the user by a sound by switching the methods of providing what is to be notified of immediately and what is not to be notified of immediately.

A notification system according to an aspect of the present disclosure includes: an obtainer that obtains an audio content to be notified of and priority information on priority of the audio content; a first notifier that notifies of the audio content; and a controller that performs first control of controlling notification of the audio content by the first notifier in accordance with the priority identified based on the priority information obtained by the obtainer. In the first control, the controller: causes the first notifier to notify of the audio content, when the priority is a first rank; and prevents the first notifier from notifying of the audio content, when the priority is a second rank that is lower than the first rank.

This configuration immediately notifies the user of an audio content with a higher priority and does not notify the user of an audio content with a lower priority, and informs the user of the fact that what is notified of by a sound is beneficial to the user. That is, the user can determine what is notified of by a sound to be important and can thus be focused on a notification by a sound, which reduces the missing of an important notification. On the other hand, a content with a lower priority is not notified of by a sound and thus disturbs less activity of the user. Accordingly, a notification can be effectively made to the user by a sound.

A notification system according to a second aspect of the present disclosure is an embodiment of the notification system according to the first aspect. In the first control, the controller causes the first notifier to provide a sound other than voice, when the priority identified based on the priority information is the second rank.

This configuration can inform the user of the fact that a content with a lower priority is notified of, without disturbing the activity of the user.

A notification system according to a third aspect of the present disclosure is an embodiment of the notification system according to the first or second aspect. The first notifier is capable of further notifying of a visual content related to the audio content. In the first control, the controller causes the first notifier to notify of the visual content, when the priority identified based on the priority information is the second rank.

This configuration can inform the user of the fact that a content with a lower priority is notified of by display, without disturbing the activity of the user.

A notification system according to a fourth aspect of the present disclosure is an embodiment of the notification system according to the first aspect. The first notifier is capable of further notifying of a visual content related to the audio content. In the first control, the controller: causes the first notifier to notify of the visual content and a sound other than voice, when the priority identified based on the priority information is the second rank; and causes the first notifier to notify of the visual content, when the priority identified based on the priority information is a third rank that is lower than the second rank.

This configuration can inform the user of the fact that a content with a lower priority is notified of, without disturbing the activity of the user. In addition, the configuration can inform the user of the fact that a content with a further lower priority is notified of by display, without disturbing the activity of the user.

A notification system according to a fifth aspect of the present disclosure is an embodiment of the notification system according to any one of the first to fourth aspect. The first notifier is capable of further notifying of a visual content related to the audio content. The first notifier is included in a first device capable of outputting a sound and a video. The controller performs second control of causing the first notifier to notify of the audio content regardless of the priority identified based on the priority information, when the first device is not outputting an image.

This configuration can notify the user by a sound regardless of the priority, when the user is not viewing any content on the first device. This configuration can notify the user without disturbing the user viewing a content.

A notification system according to a sixth aspect of the present disclosure is an embodiment of the notification system according to any one of the first to fifth aspect. The notification system further comprises: a second notifier that notifies of the audio content and is different from the first notifier. The first notifier is included in a first device capable of outputting a sound and a video. The second notifier is included in a second device capable of outputting a sound. In the first control, the controller: further causes the second notifier to notify of the audio content, when the priority is the first rank; and causes the second notifier to notify of the audio content, when the priority is the second rank.

This configuration causes the first notifier and the second notifier to notify of an audio content with a higher priority, and the second notifier to notify of an audio content with a lower priority. The second device notifies of the content with the lower priority by a sound, and can thus notify the user without disturbing the user viewing a video content on the first device, for example.

A notification method according to a seventh aspect of the present disclosure includes: obtaining an audio content to be notified of and priority information on priority of the audio content; determining whether to notify of the audio content in accordance with the priority identified based on the priority information; and notifying of the audio content based on a result of the determining. The determining includes: determining to notify of the audio content, when the priority is a first rank; and determining not to notify of the audio content, when the priority is a second rank that is lower than the first rank.

This method immediately notifies the user of an audio content with a higher priority and does not notify the user of an audio content with a lower priority, and informs the user of the fact that what is notified of by a sound is beneficial to the user. That is, the user can determine what is notified of by a sound to be important and can thus be focused on a notification by a sound, which reduces the missing of an important notification. On the other hand, a content with a lower priority is not notified of by a sound and thus disturbs less activity of the user. Accordingly, a notification can be effectively made to the user by a sound.

A control device according to an eighth aspect of the present disclosure is communicably connected to a notification device. The control device includes: an obtainer that obtains an audio content to be notified of and priority information on priority of the audio content; and a controller that controls notification of the audio content by the notification device in accordance with the priority identified based on the priority information obtained by the obtainer. The controller: causes the notification device to notify of the audio content, when the priority is a first rank; and prevents the notification device from notifying of the audio content, when the priority is a second rank that is lower than the first rank.

This configuration immediately notifies the user of an audio content with a higher priority and does not notify the user of an audio content with a lower priority, and informs the user of the fact that what is notified of by a sound is beneficial to the user. That is, the user can determine what is notified of by a sound to be important and can thus be focused on a notification by a sound, which reduces the missing of an important notification. On the other hand, a content with a lower priority is not notified of by a sound and thus disturbs less activity of the user. Accordingly, a notification can be effectively made to the user by a sound.

A recording medium according a ninth aspect of the present disclosure is a non-transitory computer-readable recording medium having recorded thereon a program for causing a computer to execute the notification method according to the seventh aspect.

Note that these general and specific aspects of the present disclosure may be implemented using a device, an integrated circuit, a computer program, or a non-transitory computer-readable recording medium such as a CD-ROM, or any combination of devices, methods, systems, integrated circuits, computer programs, or non-transitory computer-readable recording media.

Now, an embodiment will be described in detail with reference to the drawing as appropriate. Unnecessarily detailed description may be however omitted. For example, detailed description of already well-known matters and duplicated description of substantially the same configurations may be omitted. This is for avoiding unnecessarily redundant description and for easier understanding by those skilled in the art.

Note that the inventors provide the appended drawings and the following description for sufficient understanding of the present disclosure by those skilled in the art and do not intend to limit the subject matters of the claims by the appended drawings and the following description.

EMBODIMENT

1. Configuration

FIG. 1 is for illustrating an outline of a notification system according to an embodiment.

Specifically, FIG. 1 shows notification devices 10 and 20, server 30, network 60, and router 61. Among these components, notification system 1 includes notification devices 10 and 20 and server 30, for example. Notification devices 10 and 20 and server 30 are communicably connected to each other via network 60. Router 61 is a device that relays the communicative connection of notification devices 10 and 20 to network 60.

Notification system 1 notifies the user of a predetermined content as follows. Server 30 transmits a notification instruction to notification devices 10 and 20. Notification devices 10 and 20 then output a sound according to the received notification instruction. For example, server 30 transmits the notification instruction to notification devices 10 and 20 in the form of a push notification. The notification instruction includes at least one of a sound indicating the notification item (i.e., an audio content) or a character string and an image indicating the notification item (i.e., a visual content). Note that the notification instruction may include an audio content but no visual content.

Alternatively, notification devices 10 and 20 may store a plurality of notification items in advance. The notification instruction may be for instructing notification devices 10 and 20 to reproduce a sound indicating one of the notification items stored in notification devices 10 and 20. That is, the notification instruction may include information designating the notification item to be reproduced among the notification items. The notification items in this case may include an audio content and a visual content, or may include an audio content but no visual content.

FIG. 2 shows an example configuration of the notification system according to the embodiment.

Notification system 1 includes notification devices 10 and 20, and server 30. FIG. 2 shows no router 61. Notification devices 10 and 20 are, for example, owned by the same user. For example, server 30 stores the respective device information on notification devices 10 and 20 in association with the identifier of the same user.

Notification device 10 includes communicator 11, controller 12, and first notifier 13. Notification device 10 is an example of the first device capable of outputting a sound and a video, for example. Notification device 10 is a TV, for example. Notification device 10 may include a speaker for outputting a sound, and a display for outputting a video. Note that notification device 10 may be any home appliance as long as including a speaker and a display.

Notification device 10 does not necessarily include any speaker or display, and only needs to output a sound signal to a speaker and a video signal to a display. For example, notification device 10 may be a recorder or a set top box, for example.

Communicator 11 receives a notification instruction from server 30 via network 60. Communicator 11 may be a communication interface (IF), for example. Communicator 11 may be a wired or wireless communication interface. Communicator 11 is connected to network 60 not necessarily via router 61 but may be connected to network 60 via a communication line, such as a mobile phone communication network.

Once communicator 11 receives a notification instruction, controller 12 causes first notifier 13 to notify of a content according to the notification instruction. If the notification instruction includes an audio content, controller 12 causes first notifier 13 to notify of the audio content by a sound. If the notification instruction includes an audio content and a visual content, controller 12 causes first notifier 13 to notify of the audio content by a sound and the visual content by display.

If the notification instruction includes an instruction to reproduce a jingle, controller 12 may cause first notifier 13 to output the jingle. If the notification instruction includes an audio content and an instruction to reproduce a jingle, controller 12 may cause first notifier 13 to output a jingle and then to notify of the audio content by a sound. Controller 12 may be a control circuit, such as a processor.

First notifier 13 makes a notification under the control by controller 12. First notifier 13 includes sound outputter 13*a* and video outputter 13*b*. Once controller 12 executes the notification of an audio content, sound outputter 13*a* reproduces the audio content and outputs a sound or a sound signal according to the audio content. Sound outputter 13*a* may be a speaker, or may include a sound signal processing circuit and an output terminal for outputting a sound signal to a speaker. Once controller 12 executes the notification of a visual content, video outputter 13*b* reproduces the visual content and outputs display data or a display signal according to the visual content. Video outputter 13*b* may be a display or may include a video signal processing circuit and an output terminal for outputting a display signal to a display.

Notification device 20 includes communicator 21, controller 22, and second notifier 23. For example, notification device 20 is an example of the second device capable of outputting a sound. Notification device 20 may be capable of outputting a video. For example, notification device 20 is lighting equipment including a speaker. Note that notification device 20 may be a virtual private assistant (VPA) terminal, such as a smart speaker, autonomous vacuum cleaner, a refrigerator, a washing machine, an air conditioner, or any other suitable device.

Communicator 21 receives a notification instruction from server 30 via network 60. Communicator 21 may be a communication interface (IF), for example. Communicator 21 may be a wired or wireless communication interface. Communicator 21 is connected to network 60 not necessarily via router 61 but may be connected to network 60 via a communication line, such as a mobile phone communication network.

Once communicator 21 receives a notification instruction, controller 22 causes second notifier 23 to notify of a content according to the notification instruction. If the notification instruction includes an audio content, controller 22 causes second notifier 23 to notify of the audio content by a sound. If the notification instruction includes an audio content and a visual content, controller 12 causes second notifier 23 to notify of the audio content by a sound. In this case, since second notifier 23 cannot notify of any visual content, controller 22 does not cause second notifier 23 to notify of the visual content.

If the notification instruction includes an instruction to reproduce a jingle, controller 22 may cause second notifier 23 to output a jingle. If the notification instruction includes an audio content and an instruction to reproduce a jingle, controller 22 causes second notifier 23 to output a jingle and then to notify of the audio content by a sound. Controller 22 may be a control circuit, such as a processor.

Second notifier 23 makes a notification under the control by controller 22. Second notifier 23 includes sound outputter 23*a*. Once controller 22 notifies of an audio content, sound outputter 23*a* reproduces the audio content, and outputs a sound or a sound signal according to the audio content. Sound outputter 23*a* may be a speaker or may include a sound signal processing circuit and an output terminal for outputting a sound signal to a speaker.

Server 30 includes communicator 31, storage 32, and controller 33. Server 30 is an example of the control device.

Communicator 31 exchanges information with notification devices 10 and 20 via network 60. Specifically, communicator 31 transmits a notification instruction to notification devices 10 and 20. Communicator 31 may be a wired or wireless communication interface, for example.

Storage 32 stores information indicating the addresses of notification devices 10 and 20 as the destinations of the notification instruction. Storage 32 may store a plurality of notification instructions, if the notification instruction includes a notification item in the form of sound data. Storage 32 stores the respective device information on notification devices 10 and 20 in association with the identifier of the same user. Storage 32 may store, for each of a plurality of users, the device information on one or more notification devices owned by the user. The device information may include information indicating the addresses of notification devices 10 and 20. Storage 32 may store the history of notifications to notification devices 10 and 20.

If any of predetermined conditions is met in server 30, controller 33 causes communicator 31 to transmit a predetermined notification instruction to notification devices 10 and 20. The expression "any of predetermined conditions is met in server 30" may mean, for example, that a predetermined time has come, that predetermined information has been received, or a predetermined operation has been performed predetermined times. In other words, if one of the conditions in server 30 is met, controller 33 causes communicator 31 to transmit, to notification devices 10 and 20, a notification instruction associated with the one of the conditions.

For example, the conditions are associated with a plurality of contents. If one of the conditions is met, controller 33 selects the content associated with the condition as the content to be notified of. Controller 33 then obtains the selected content and the priority information on the priority of the content from storage 32. The content to be notified of includes at least an audio content, out of the audio content and a visual content.

The contents associated with the conditions are stored in storage 32. The contents may be each stored in association with the priority information on the priority of the content. The priority information indicates the priority. The priority may be classified into, for example, three ranks of a first rank (i.e., a high priority), a second rank (an intermediate priority), and a third rank (i.e., a low priority) in the descending order.

Note that the priority information may be used for identifying the priority. The priority information may indicate the category of a content. In this case, the category of a content may be associated with the priority, and the category information indicating the category associated with the priority may be stored in storage 32. The contents may be associated with the categories so as to be classified based on the categories. This allows controller 33 to identify the priority of a content in accordance with the category of the content.

Alternatively, the priority information may indicate the category of the condition associated with a content. In this case, the conditions associated with contents may be associated with categories. Accordingly, if one of the conditions is met, controller 33 can identify the content associated with the one of the conditions and identify the priority associated with the category associated with the one of the conditions as the priority of the identified content.

The conditions may be based on personal information, such as user information indicating the attribute of the user and preference information indicating the preference of the user. The "attribute of the user" corresponds to demographic information and includes, for example, the generation, gender, residence area, income, civil status (single/married), children (Y/N), occupation, company name, academic background, and other information on the user. The "information indicating the preference of the user" indicates the favorite genre of the user. For example, the preference of a certain user may include games, game consoles, game strategies, baseball, American football, skiing, cameras, audio devices, recorders, liquid crystal display (LCD) televisions (TVs), high definition (HD) TVs, videos, social networking service (SNS), music, coffee, cooking recipes, automobiles, automobile exterior, travel, travel bags, route maps, child rearing, interior design, and gardening.

For example, if the category of a content meeting any of the conditions is identical or similar to the attribute of the user or the preference information on the user, a higher priority may be set as the priority of the "content meeting any of the conditions". On the contrary, if the category of a content meeting any of the conditions is not identical or similar to the attribute of the user or the preference information on the user, a lower priority may be set as the priority of the "content meeting any of the conditions". The similarity is obtained as a result of comparison between the category of a content meeting any of the conditions and the attribute of the user or the preference information on the user. The higher the similarity is, the higher priority may be set as the priority of the "content meeting any of the conditions".

The conditions may be each set to have a priority of the associated content variable depending on the time period of a day. For example, if a certain condition is met in the morning, the priority of a content associated with the condition may be a first rank. On the other hand, if the certain condition is met in the afternoon, the priority of the content associated with the condition may be a second rank.

As described above, controller 33 identifies the priority based on the obtained priority information. Controller 33 then performs first control of controlling the notification of an audio content by notification devices 10 and 20 in accordance with the identified priority. In the first control, controller 33 causes notification device 10 to notify of an audio content included in the content to be notified of, if the priority of the content is the first rank. In this case, controller 33 may also cause notification device 20 to notify of the audio content.

In the first control, controller 33 prevents notification device 10 from notifying of any audio content included in the content to be notified of, if the priority of the content is a rank (i.e., the second rank or the third rank) lower than the first rank. In this case, controller 33 may cause notification device 10 to emit a sound other than voice. For example, controller 33 may cause notification device 10 to emit a jingle. In this case, controller 33 may cause notification device 10 to notify of, for example, a visual content included in the content to be notified of. In this case, controller 33 may cause notification device 20 to notify of an audio content included in the content to be notified of.

In the first control, controller 33 may cause notification device 10 to provide a jingle and a visual content, if the priority of the content to be notified of is the second rank. Controller 33 may cause notification device 10 to notify of a visual content, if the priority is a third rank. If the priority is the third rank, controller 33 prevents notification device 10 from providing any jingle. In this case, controller 33 does not necessarily cause notification device 10 to notify of the visual content.

2. Operation

Now, an operation of notification system 1 will be described.

Figure 3:
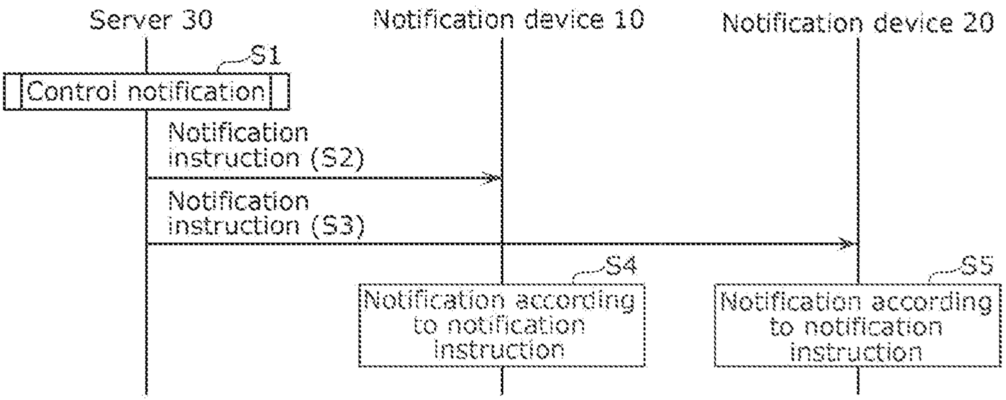
FIG. 3 is a sequence diagram showing an example operation of the notification system.

FIG. 3 is a sequence diagram showing an example operation of the notification system.

First, server 30 performs notification control (S1). The details of the notification control will be described later.

Based on the notification control, server 30 transmits a notification instruction to notification device 10 (S2) and a/the notification instruction to notification device 20 (S3).

Notification device 10 makes a notification based on the notification instruction received from server 30 (S4).

Similarly, notification device 20 makes a notification based on the notification instruction received from server 30 (S5).

The notification instruction transmitted from server 30 in step S2 may be the same as or different from the notification instruction transmitted from server 30 in step S3.

Figure 4:
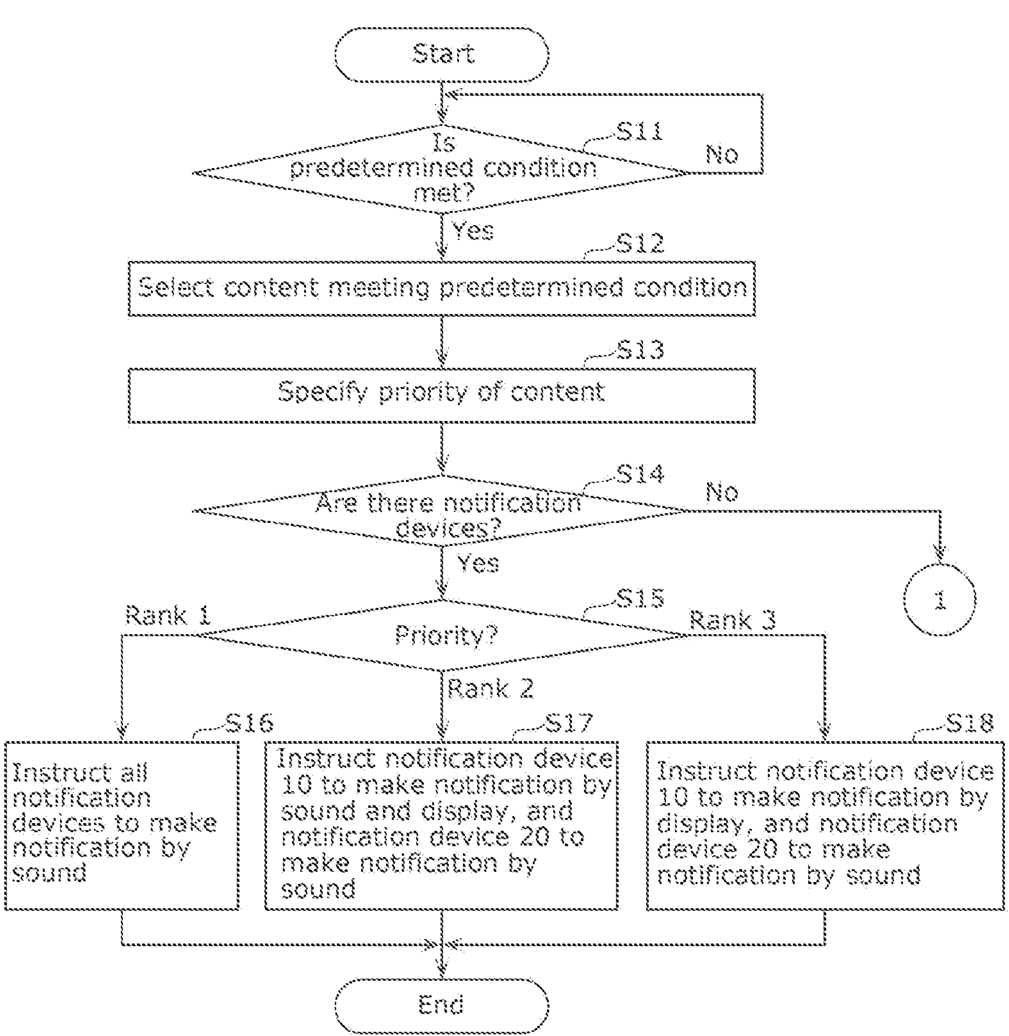
FIG. 4 is a flowchart showing example notification control in a server.
Figure 5:
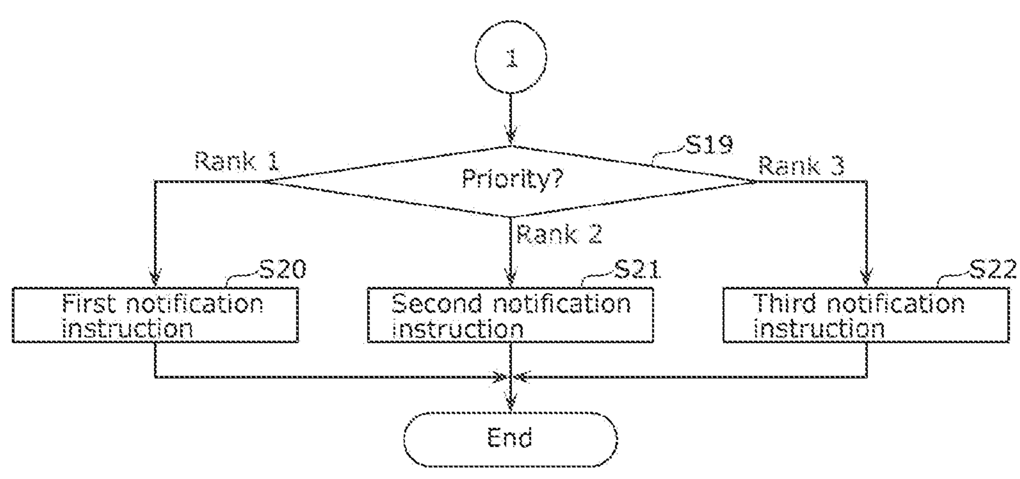
FIG. 5 is a flowchart showing the example notification control in the server.

FIGS. 4 and 5 are flowcharts showing example notification control in a server.

Server 30 determines whether a certain user meets predetermined conditions (S11).

If the user is determined to meet the predetermined conditions (Yes in S11), server 30 executes step S12. If the user is determined to meet none of the predetermined conditions (No in S11), the process returns to step S11.

In step S12, server 30 selects the content meeting predetermined conditions (S12).

Next, based on the selected content, server 30 identifies the priority of the content (S13).

Next, server 30 determines whether a certain user has registered a plurality of notification devices (S14). That is, server 30 determines whether the certain user owns the plurality of notification devices.

If the certain user is determined to have registered a plurality of notification devices (Yes in S14), server 30 executes step S15. If the certain user is determined not have registered a plurality of notification devices (No in S14), server 30 executes step S19.

In step S15, server 30 determines which one of ranks 1, 2, and 3 the priority is (S15).

Server 30 executes step S16, if the priority is rank 1 (i.e., "rank 1" in S15); step S17, if the priority is rank 2 (i.e., "rank 2" in S15); and step S18, if the priority is rank 3 (i.e., "rank 3" in S15).

In step S16, server 30 instructs each of notification devices 10 and 20 to make a notification by a sound (S16). Specifically, server 30 transmits, to notification device 10, an instruction to reproduce a jingle and an instruction to make a notification including the notification of an audio content and a visual content. In addition, server 30 transmits, to notification device 20, an instruction to reproduce a jingle and an instruction to make a notification including the notification of the audio content.

In step S17, server 30 instructs notification device 10 to reproduce a jingle and make a notification including the notification of a visual content, and notification device 20 to make a notification by a sound (S17). Specifically, server 30 transmits, to notification device 10, an instruction to reproduce a jingle and an instruction to make a notification including the notification of a visual content. In addition, server 30 transmits, to notification device 20, an instruction to reproduce a jingle and an instruction to make a notification including the notification of an audio content.

In step S18, server 30 instructs notification device 10 to make a notification including the notification of a visual content, and notification device 20 to make a notification by a sound (S18). Specifically, server 30 transmits, to notification device 10, an instruction to make a notification including the notification of a visual content. In addition, server 30 transmits, to notification device 20, an instruction to reproduce a jingle and an instruction to make a notification including the notification of an audio content.

In step S19, server 30 determines which one of ranks 1, 2, and 3 the priority is (S19).

Server 30 executes step S20, if the priority is rank 1 (i.e., "rank 1" in S19); step S21, if the priority is rank 2 (i.e., "rank 2" in S19); and step S22, if the priority is rank 3 (i.e., "rank 3" in S19).

In step S20, server 30 makes a first notification instruction (S20). Assume that a certain user owns only a notification device (e.g., notification device 10) that can provide sounds and videos. In this case, in the first notification instruction, server 30 transmits, to notification device 10, an instruction to reproduce a jingle and an instruction to make a notification including the notification of an audio content and a visual content. Assume that the certain user owns only a notification device (e.g., notification device 20) that can provide sounds but no videos. In this case, in the first notification instruction, server 30 transmits, to notification device 20, an instruction to reproduce a jingle and an instruction to make a notification including the notification of the audio content.

In step S21, server 30 makes a second notification instruction (S21). Assume that a certain user owns only a notification device (e.g., notification device 10) that can provide sounds and videos. In this case, in the second notification instruction, server 30 transmits, to notification device 10, an instruction to reproduce a jingle and an instruction to make a notification including the notification of a visual content. Assume that the certain user owns only a notification device (e.g., notification device 20) that can provide sounds but no videos. In this case, in the second notification instruction, server 30 transmits, to notification device 20, a notification instruction including an instruction to reproduce a jingle. Note that the notification instruction transmitted to notification device 20 may further include an audio content.

In step S22, server 30 makes a third notification instruction (S22). Assume that a certain user owns only a notification device (e.g., notification device 10) that can provide sounds and videos. In this case, in the third notification instruction, server 30 transmits, to notification device 10, an instruction to make a notification including the notification of a visual content. Assume that the certain user owns only a notification device (e.g., notification device 20) that can provide sounds but no videos. In this case, in the third notification instruction, server 30 transmits, to notification device 20, a notification instruction including an instruction to reproduce a jingle.

In this manner, server 30 determines whether to notify of an audio content from notification devices 10 and 20 in accordance with the priority identified based on the priority information. Server 30 then notifies of the audio content based on a result of the determination.

3. Advantages

Notification system 1 according this embodiment includes an obtainer (controller 33), first notifier 13, and controller 33. The obtainer obtains an audio content to be notified of and priority information on priority of the audio content. First notifier 13 notifies of the audio content. Controller 33 performs first control of controlling notification of the audio content by first notifier 13 in accordance with the priority identified based on the priority information obtained by the obtainer. In the first control, controller 33 causes first notifier 13 to notify of the audio content, when the priority is a first rank; and prevents first notifier 13 from notifying of the audio content, when the priority is a second rank that is lower than the first rank.

This configuration immediately notifies the user of an audio content with a higher priority and does not notify the user of an audio content with a lower priority, and informs the user of the fact that what is notified of by a sound is beneficial to the user. That is, the user can determine what is notified of by a sound to be important and can thus be focused on a notification by a sound, which reduces the missing of an important notification. On the other hand, a content with a lower priority is not notified of by a sound and thus disturbs less activity of the user. Accordingly, a notification can be effectively made to the user by a sound.

In notification system 1 according this embodiment, in the first control, controller 33 causes first notifier 13 to provide a sound other than voice, when the priority identified based on the priority information is the second rank.

This configuration can inform the user of the fact that a content with a lower priority is notified of, without disturbing the activity of the user.

In notification system 1 according this embodiment, first notifier 13 is capable of further notifying of a visual content related to the audio content. In the first control, controller 33 causes first notifier 13 to notify of the visual content, when the priority identified based on the priority information is the second rank.

This configuration can inform the user of the fact that a content with a lower priority is notified of by display, without disturbing the activity of the user.

In notification system 1 according this embodiment, first notifier 13 is capable of further notifying of a visual content related to the audio content. In the first control, controller 33 causes: first notifier 13 to notify of the visual content and a sound other than voice, when the priority identified based on the priority information is the second rank; and first notifier 13 to notify of the visual content, when the priority identified based on the priority information is a third rank that is lower than the second rank.

The notification system can inform the user of the fact that a content with a lower priority is notified of, without disturbing the activity of the user. In addition, the notification system can inform the user of the fact that a content with a further lower priority is notified of by display, without disturbing the activity of the user.

Notification system 1 according this embodiment further includes second notifier 23. Second notifier 23 notifies of an audio content and is different from first notifier 13. First notifier 13 is included in a first device (e.g., notification device 10) capable of outputting a sound and a video. Second notifier 23 is included in a second device (e.g., notification device 20) capable of outputting a sound. In the first control, controller 33 further causes second notifier 23 to notify of the audio content, when the priority is the first rank; and prevents second notifier 23 from notifying of the audio content, when the priority is the second rank.

This configuration causes first notifier 13 and second notifier 23 to notify of an audio content with a higher priority, and second notifier 23 to notify of an audio content with a lower priority. The second device notifies of the content with the lower priority by a sound, and can thus notify the user without disturbing the user viewing a video content on the first device, for example.

4. Variation (1) In notification system 1 according the embodiment described above, controller 33 may perform second control of causing notification device 10 to notify of an audio content included in the content to be notified of regardless of the priority identified based on the priority information, when notification device 10 is not outputting an image. In this case, communicator 31 may periodically obtain state information indicating the state of notification device 10 from notification device 10. Alternatively, communicator 31 may request notification device 10 for state information at the timing of notifying of the content and obtain the state information from notification device 10. Controller 33 determines whether notification device 10 is outputting an image, based on the state information obtained by communicator 31. The state information indicates whether notification device 10 is outputting an image. For example, the state information may be the information indicating whether notification device 10 is in a standby state. The "standby state" includes at least the state where notification device 10 is not outputting an image.

Figure 6:
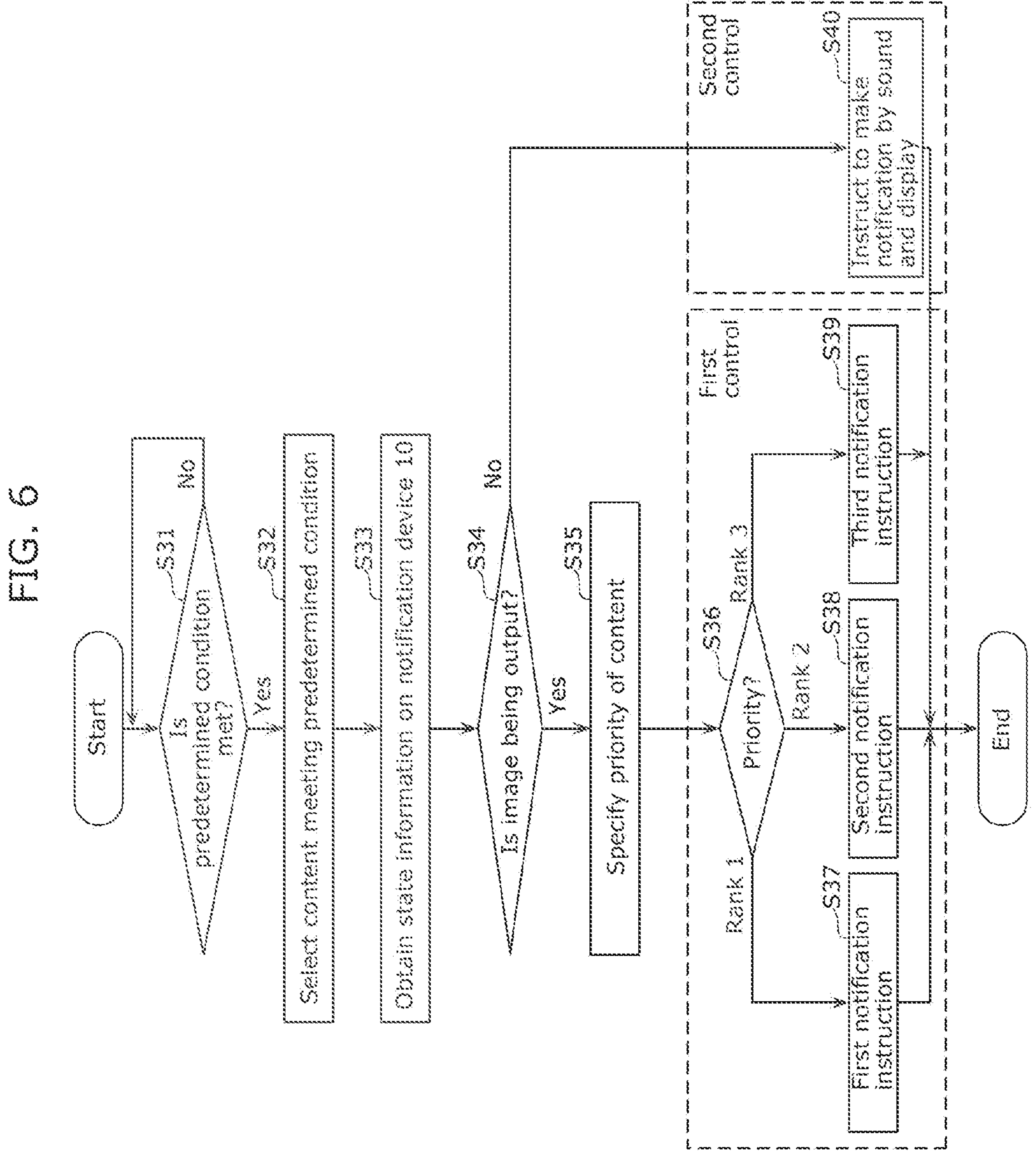
FIG. 6 is a flowchart showing example notification control in a server according to Variation (1).

FIG. 6 is a flowchart showing example notification control in a server according to Variation (1).

Server 30 determines whether a certain user meets any of predetermined conditions (S31).

If the user is determined to meet any the predetermined conditions (Yes in S31), server 30 executes step S32. On the other hand, if the user is determined to meet none of the predetermined conditions (No in S31), the process returns to step S31.

In step S32, server 30 selects a content meeting any of predetermined conditions (S32).

Server 30 obtains the state information on notification device 10 from notification device 10 (S33).

Server 30 determines whether notification device 10 is outputting an image, based on the state information (S34).

If notification device 10 is determined to be outputting an image (Yes in S34), server 30 executes step S35. On the other hand, if notification device 10 is determined to be not outputting an image (No in S34), server 30 executes step S40.

In step S35, based on the content selected in step S32, server 30 identifies the priority of the content (S35).

Next, server 30 determines which one of ranks 1, 2, and 3 the priority is (S36).

Server 30 executes step S37, if the priority is rank 1 (i.e., "rank 1" in S36); step S38, if the priority is rank 2 (i.e., "rank 2" in S36); and step S39, if the priority is rank 3 (i.e., "rank 3" in S36).

In step S37, server 30 makes a first notification instruction (S37). In the first notification instruction, server 30 transmits, to notification device 10, an instruction to reproduce a jingle and an instruction to make a notification including the notification of an audio content and a visual content.

In step S38, server 30 makes a second notification instruction (S38). In the second notification instruction, server 30 transmits, to notification device 10, an instruction to reproduce a jingle and an instruction to make a notification including the notification of a visual content.

In step S39, server 30 makes a third notification instruction (S39). In the third notification instruction, server 30 transmits, to notification device 10, an instruction to make a notification including the notification of a visual content.

In step S40, server 30 transmits, to notification device 10, an instruction to reproduce a jingle and an instruction to make a notification including the notification of an audio content and a visual content (S40).

In this manner, in notification system 1 according to Variation (1), first notifier 13 is capable of further notifying of a visual content related to the audio content. First notifier 13 is included in a first device (e.g., notification device 10) capable of outputting a sound and a video. When the first device is not outputting an image, controller 33 performs second control of causing first notifier 13 to notify of an audio content, regardless of the priority identified based on the priority information.

This configuration can notify the user by a sound regardless of the priority, when the user is not viewing any content on the first device. This configuration can notify the user without disturbing the user viewing a content.

(2) In notification system 1 according the embodiment described above, controller 33 selects a content to be notified of, out of a plurality of contents. The configuration is not limited thereto. If one of the conditions is met, the content to be notified of may be generated under a rule associated with the one of the conditions in advance.

(3) In notification system 1 according the embodiment described above, notification device 10 reproduces an audio content or a visual content, if included in the notification instruction. The content is not limited thereto. For example, the notification instruction may always include an audio content and a visual content, and further include information indicating whether to notify of an audio content and information indicating whether to inform of a visual content. In this manner, notification device 10 may switchably notify of the audio content and the visual content included in the notification instruction, based on the information indicating whether to notify of the audio content and the information indicating whether to notify of the visual content.

5. Others

In the embodiment described above, each element may be achieved by dedicated hardware or by executing a software program suitable for the element. Each element may be achieved by a program executor, such as a central processing unit (CPU) or a processor, reading and executing a software program recorded in a recording medium, such as a hard disk drive (HDD) or a semiconductor memory. Here, the software for operating the system, the information terminal, the server, the camera equipment, or other elements in the embodiment described above is a program that causes a computer to execute the steps included in the flowcharts shown in the drawings.

Note that the present disclosure also includes the following cases.

(1) Specifically, the devices described above are each a computer system including a microprocessor, a read-only memory (ROM), a random-access memory (RAM), a hard disk unit, a display unit, a keyboard, a mouse, or other components. The RAM or the hard disk unit includes computer programs. The microprocessor operates in accordance with the computer programs so that the devices fulfill their functions. The computer programs are each obtained by combining a plurality of command codes indicating instructions to the computer to fulfill predetermined functions.

(2) Some or all of the components of the devices described above may be a single system large-scale integrated (LSI) circuit. The system LSI circuit is a super multifunctional LSI circuit manufactured by integrating a plurality of components on a single chip, and specifically is a computer system including a microprocessor, a ROM, a RAM, and other suitable components. The RAM stores computer programs. The microprocessor operates in accordance with the computer programs so that the system LSI circuit fulfills its functions.

(3) Some or all of the components of the devices described above are each an IC card or a single module attachable to and detachable from the devices. The IC card or the module is a computer system including a microprocessor, a ROM, a RAM, and other suitable components. The IC card or the module may include the super LSI circuit described above. The microprocessor operates in accordance with a computer program so that the IC card or the module fulfills its functions. This IC card or this module may have a resistance to tamper.

(4) The present disclosure may be directed to the method described above. Alternatively, the present disclosure may be directed to a computer program causing a computer to execute the method, or a digital signal indicating the computer program.

The present disclosure may be directed to the computer program or the digital signal recorded on a computer-readable recording medium, such as a flexible disk, a hard disk, a CD-ROM, a magneto-optical (MO) disk, a DVD, a DVD-ROM, a DVD-RAM, a Blu-ray (registered trademark) disk (BD), or a semiconductor memory. Alternatively, the present disclosure may be directed to a digital signal recorded in the recording medium.

The present disclosure may be directed to the computer program or the digital signal transmitted via a telecommunication line, a wired or wireless communication line, a network represented by the Internet, data broadcasting, or any other suitable means.

The present disclosure may be directed to a computer system including a microprocessor and a memory. The memory may store the computer program described above. The microprocessor may operate in accordance with the computer program described above.

The present disclosure may be directed to another independent computer system that records the program or the digital signal in the recording medium and transfers the recorded program or digital signal, or transfers the program or the digital signal via the network or any other suitable means.

(5) The embodiment and variation described above may be combined.

INDUSTRIAL APPLICABILITY

The present disclosure is useful as a notification system, and so on, capable of effectively notifying the user of an audio content.

The invention claimed is:

1. A notification system comprising:

an obtainer that obtains a notification instruction including audio content to be notified of and priority information indicating a priority of the audio content;

a first notifier that notifies of the audio content;

a second notifier that notifies of the audio content and is different from the first notifier; and a controller that performs first control of controlling notification of the audio content by the first notifier in accordance with the priority identified based on the priority information obtained by the obtainer, wherein in the first control, the controller:

causes the first notifier to notify of the audio content, when the priority is a first rank; and prevents the first notifier from notifying of the audio content, when the priority is a second rank that is lower than the first rank, the first notifier is capable of further notifying of a visual content related to the audio content, the first notifier is included in a first device capable of outputting sound and video, the controller performs second control of causing the first notifier to notify of the audio content regardless of the priority identified based on the priority information, when the first device is not outputting an image;

the second notifier is included in a second device capable of outputting a sound, and in the first control, the controller:

further causes the second notifier to notify of the audio content, when the priority is the first rank; and causes the second notifier to notify of the audio content, when the priority is the second rank.

2. The notification system according to claim 1, wherein in the first control, the controller causes the first notifier to provide a sound other than voice, when the priority identified based on the priority information is the second rank.

3. The notification system according to claim 1, wherein in the first control, the controller causes the first notifier to notify of the visual content, when the priority identified based on the priority information is the second rank.

4. The notification system according to claim 1, wherein in the first control, the controller:

causes the first notifier to notify of the visual content and a sound other than voice, when the priority identified based on the priority information is the second rank; and causes the first notifier to notify of the visual content, when the priority identified based on the priority information is a third rank that is lower than the second rank.

5. The notification system according to claim 1, wherein the notification instruction includes the audio content, the visual content, first information indicating whether to notify of the audio content, and second information indicating whether to notify of the visual content, and the first device determines, based on the first information and the second information, whether to provide notification of each of the audio content and the visual content included in the notification instruction.

6. The notification system according to claim 1, wherein when the priority is the second rank, the controller:

transmits, to the first device, a first notification instruction including a playback instruction for a jingle sound and the visual content; and transmits, to the second device, a second notification instruction including a playback instruction for a jingle sound and the audio content.

7. The notification system according to claim 1, wherein when one of a plurality of conditions is satisfied, the controller generates content to be included in a notification based on a rule previously associated with a satisfied condition.

8. A notification method performed by a notification system including a first notifier that notifies of audio content and a second notifier that notifies of the audio content and is different from the first notifier, the notification method comprising:

obtaining a notification instruction including the audio content to be notified of and priority information indicating a priority of the audio content;

performing first control of controlling notification of the audio content by the first notifier in accordance with the priority identified based on the priority information, wherein in the first control:

when the priority is a first rank, the first notifier is caused to notify of the audio content; and when the priority is a second rank that is lower than the first rank, the first notifier is prevented from notifying of the audio content, the first notifier is capable of further notifying of a visual content related to the audio content, the first notifier is included in a first device capable of outputting sound and video, the notification method further comprises performing second control of causing the first notifier to notify of the audio content regardless of the priority identified based on the priority information, when the first device is not outputting an image, the second notifier is included in a second device capable of outputting a sound, and in the first control:

when the priority is the first rank, the second notifier is further caused to notify of the audio content; and when the priority is the second rank, the second notifier is caused to notify of the audio content.

9. The notification method according to claim 8, wherein the notification instruction includes the audio content, the visual content, first information indicating whether to notify of the audio content, and second information indicating whether to notify of the visual content, and the first device determines, based on the first information and the second information, whether to provide notification of each of the audio content and the visual content included in the notification instruction.

10. The notification method according to claim 8, wherein when the priority is the second rank:

a first notification instruction includes a playback instruction for a jingle sound and the visual content is transmitted to the first device; and a second notification instruction includes a playback instruction for a jingle sound and the audio content is transmitted to the second device.

11. The notification method according to claim 8, wherein when one of a plurality of conditions is satisfied, content to be included in a notification is generated based on a rule previously associated with a satisfied condition.

12. A non-transitory computer-readable recording medium having recorded thereon a program for causing a computer to execute the notification method according to claim 8.

13. A control device communicably connected to a first notification device and a second notification device, the control device comprising:

an obtainer that obtains a notification instruction including audio content to be notified of and priority information indicating a priority of the audio content; and a controller that performs first control of controlling notification of the audio content by the first notification device in accordance with the priority identified based on the priority information obtained by the obtainer, wherein in the first control, the controller:

causes the first notification device to notify of the audio content, when the priority is a first rank; and prevents the first notification device from notifying of the audio content, when the priority is a second rank that is lower than the first rank, the first notification device is capable of outputting a sound and video and is capable of further notifying of a visual content related to the audio content, the controller performs second control of causing the first notification device to notify of the audio content regardless of the priority identified based on the priority information, when the first notification device is not outputting an image, the second notification device is capable of outputting a sound, and in the first control, the controller:

further causes the second notification device to notify of the audio content, when the priority is the first rank; and causes the second notification device to notify of the audio content, when the priority is the second rank.

14. The control device according to claim 13, wherein the notification instruction includes the audio content, the visual content, first information indicating whether to notify of the audio content, and second information indicating whether to notify of the visual content, and the first notification device determines, based on the first information and the second information, whether to provide notification of each of the audio content and the visual content included in the notification instruction.

15. The control device according to claim 13, wherein when the priority is the second rank, the controller:

transmits, to the first notification device, a first notification instruction including a playback instruction for a jingle sound and the visual content; and transmits, to the second notification device, a second notification instruction including a playback instruction for a jingle sound and the audio content.

16. The control device according to claim 13, wherein when one of a plurality of conditions is satisfied, the controller generates content to be included in a notification based on a rule previously associated with a satisfied condition.

* * * * *